United States Patent
Campus

(10) Patent No.: US 8,166,888 B2
(45) Date of Patent: May 1, 2012

(54) END STRUCTURAL ASSEMBLY OF A RAIL CAR BODY

(75) Inventor: Emigliano Campus, Yves (FR)

(73) Assignee: Alstom Transport SA, Levallois-Perret (FR)

( * ) Notice: Subject to any disclaimer, the term of this patent is extended or adjusted under 35 U.S.C. 154(b) by 60 days.

(21) Appl. No.: 11/809,451

(22) Filed: Jun. 1, 2007

(65) Prior Publication Data
US 2007/0295240 A1 Dec. 27, 2007

(30) Foreign Application Priority Data

Jun. 2, 2006 (FR) ...................................... 06 04956

(51) Int. Cl.
B61D 17/20 (2006.01)
B61D 17/06 (2006.01)

(52) U.S. Cl. .......................................... 105/8.1; 105/4.3

(58) Field of Classification Search .................... 105/4.1, 105/4.2, 4.3, 8.1, 15, 21, 199.1, 199.2, 396, 105/402
See application file for complete search history.

(56) References Cited

U.S. PATENT DOCUMENTS

| | | | | |
|---|---|---|---|---|
| 2,158,062 A * | 5/1939 | Blomberg | | 105/4.1 |
| 2,274,471 A * | 2/1942 | Breer | | 105/4.1 |
| 4,718,351 A * | 1/1988 | Engle | | 105/4.3 |
| 4,942,824 A * | 7/1990 | Cros | | 105/4.3 |
| 4,947,761 A | 8/1990 | Engle | | |
| 5,060,577 A * | 10/1991 | Steinmetz | | 105/15 |
| 5,150,657 A | 9/1992 | Bourgeot | | |
| 5,615,786 A | 4/1997 | Hoyon et al. | | |
| 5,921,185 A * | 7/1999 | Hoyon et al. | | 105/4.1 |
| 6,138,576 A | 10/2000 | Szatrowski | | |
| 6,176,379 B1 | 1/2001 | Daugherty, Jr. | | |
| 6,234,702 B1 | 5/2001 | Jeunehomme et al. | | |
| 6,367,391 B1 | 4/2002 | Thoman | | |
| 6,510,800 B1 * | 1/2003 | Zaerr et al. | | 105/4.1 |
| 2002/0073878 A1 * | 6/2002 | Teacherson | | 105/3 |
| 2006/0108310 A1 | 5/2006 | Krome | | |

FOREIGN PATENT DOCUMENTS

| | | |
|---|---|---|
| DE | 19819927 | 11/1999 |
| DE | 20112340 U1 | 12/2002 |
| EP | 0343482 A1 | 11/1989 |
| EP | 0435755 A1 | 7/1991 |
| EP | 0667271 A1 | 8/1995 |
| EP | 0906860 A1 | 4/1999 |
| EP | 1125816 | 8/2001 |
| EP | 1650098 A2 | 4/2006 |

* cited by examiner

*Primary Examiner* — Joe Morano, IV
*Assistant Examiner* — Zachary Kuhfuss
(74) *Attorney, Agent, or Firm* — Davidson, Davidson & Kappel, LLC

(57) ABSTRACT

This structural assembly provided is of the type intended to be fixed to a longitudinal end of a rail car body including a chassis, a roof and lateral faces forming a tubular cell, in order to articulate the body to a body of another adjacent car and to transfer the load of the body to a body support bogie that is common to that other car. A lower cross-member may have a central portion and two lateral portions, the central portion being provided in order to carry a member for articulating the body to a body of another car, and each lateral portion being suitable for being supported on suspension devices for the body on a bogie.

19 Claims, 11 Drawing Sheets

END STRUCTURAL ASSEMBLY OF A RAIL CAR BODY

This claims the benefit of French Patent Application No. 06 04956, filed on Jun. 2, 2006 and hereby incorporated by reference herein.

TECHNICAL FIELD

The present invention relates to the field of rail vehicles and, more precisely, the bodies of cars of articulated sets, in which a car of the set is articulated to at least one of the adjacent cars, the two cars being supported on a common support bogie.

BACKGROUND TO THE INVENTION

The body of an articulated rail car generally comprises a chassis, a roof, two lateral faces and two body end structural assemblies. Each lateral face extends between a longitudinal edge of the chassis and a longitudinal edge of the roof. The chassis, the roof and the lateral faces form a tubular cell. Each body end structural assembly is arranged at a longitudinal end of the body so as to partially or completely close it.

SUMMARY OF THE INVENTION

It may be desirable to construct rail car bodies for transporting travellers so as to be suitable for withstanding great forces in order to be able to receive a large number of passengers whilst limiting the weight of the body in order to comply with the permissible load limits on the axles of the bogies, and being able to be produced readily and at low cost.

The present invention provides an end structural assembly of a rail car body, the body comprising a chassis, a roof and lateral faces, the end structural assembly being of the type intended to be arranged at a longitudinal end of the body in order to articulate the body to a body of another adjacent car and to transfer the load of the body to a support bogie that is common to that other car, wherein the end structural assembly is at least partially constructed from composite material.

According to other embodiments the invention may comprise one or more of the following features, taken in isolation or according to any technically possible combination:

it comprises a member for articulating the body end structural assembly to another body end structural assembly;

the articulation member is of metal;

it comprises at least one longitudinal thrust beam which is intended to extend between the articulation member and a rail car body chassis;

it comprises two separate longitudinal beams;

the or each longitudinal beam is constructed from composite material;

the or each longitudinal beam is fixed to the articulation member in order to extend towards the inner side of the car;

it comprises a lower cross-member which has end portions which are intended to be supported on suspension devices of the body relative to a bogie;

the lower cross-member is constructed at least partially from composite material;

the lower cross-member comprises a lower shell and an upper shell which are superimposed and which confer on the cross-member a box-like structure;

the articulation member is fixed to the lower cross-member;

the articulation member is at least partially received inside the lower cross-member;

the lower cross-member comprises, above the articulation member, a recess for receiving a suspension ring which is intended to be arranged vertically between the articulation member and a corresponding articulation member of a second body end structural assembly of another car that is intended to be supported in abutment against the first body end structural assembly;

the or each longitudinal beam is fixed to the lower cross-member so as to extend towards the inner side of the car from the lower cross-member;

it comprises at least one member for coupling to a second body end structural assembly of another car;

the coupling member is composed of metal and is fixed to the lower cross-member;

the coupling member is one-piece with the articulation member;

it comprises at least one panel for closing the body end structural assembly which is intended to extend transversely in order to at least partially close the end of the body;

the panel is constructed from composite material;

it comprises a communication tunnel which allows passengers to pass through the body end structural assembly in order to move to an adjacent car;

the tunnel is constructed from composite material;

the tunnel is at least partially one-piece with a closure panel;

it comprises at least two closure panels which co-operate in order to close the end of the body, a first upright of the tunnel being one-piece with a first panel, a second upright of the tunnel being one-piece with a second panel;

it comprises an anti-roll damping support which is fixed to the tunnel;

it comprises brackets, each bracket extending vertically and being intended to be supported with its base on a suspension device;

the or each bracket is constructed from composite material;

the lower cross-member of composite material is constructed in one piece.

The invention also provides a railway car body comprising a body chassis, a roof and two lateral faces, each extending between a longitudinal edge of the roof and a longitudinal edge of the body chassis, and at least one body end structural assembly, as defined above, that is fixed at a longitudinal end of the body to the body chassis, the roof and the lateral faces.

BRIEF DESCRIPTION OF THE DRAWINGS

The invention and its advantages will be better understood from a reading of the following description which is given purely by way of example and with reference to the appended drawings, in which.

DESCRIPTION OF PREFERRED EMBODIMENTS

Figure 1:
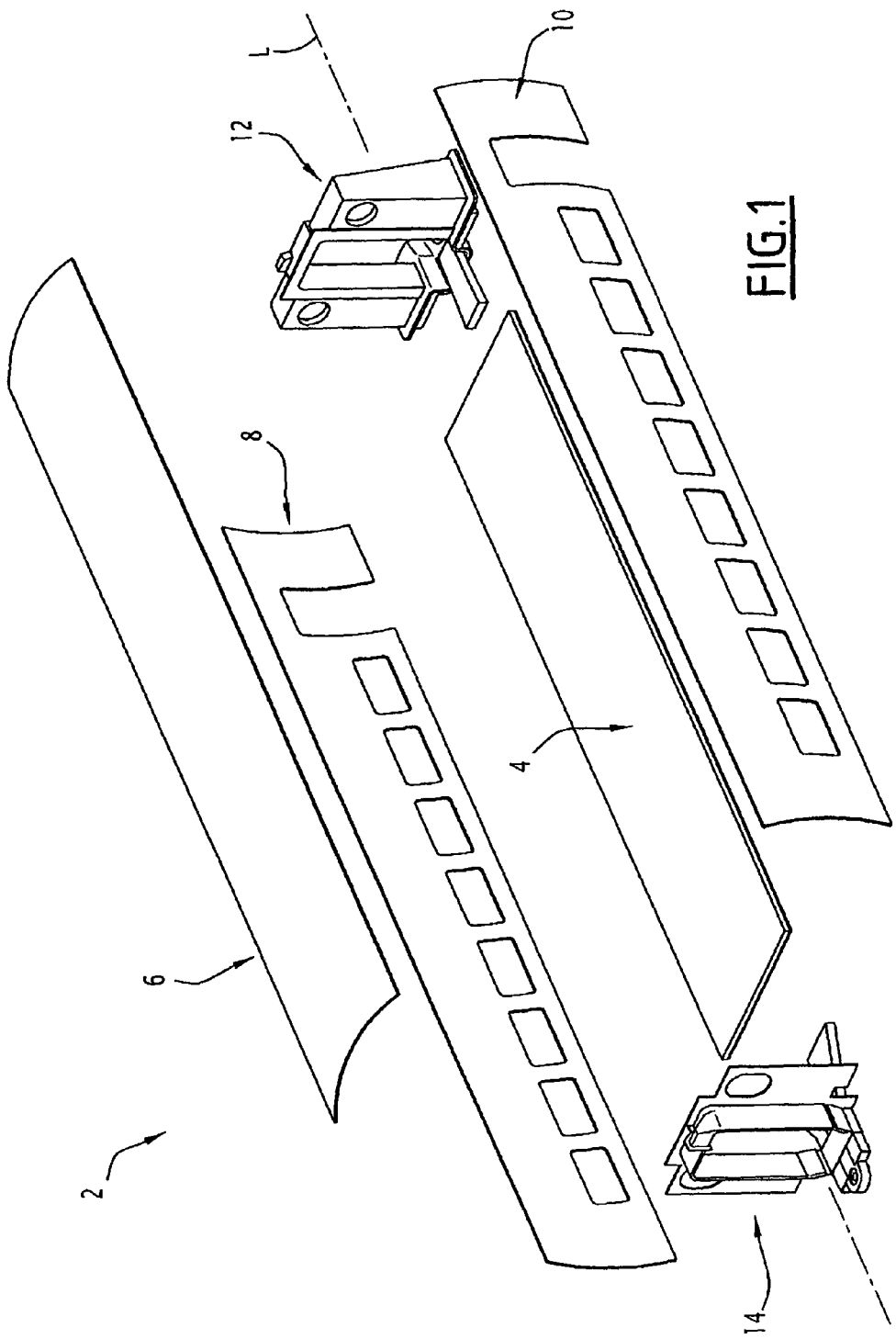
FIG. 1 is a schematic perspective exploded view of a rail car body, having two body end structural assemblies according to the invention.

FIG. 1 illustrates a rail car body 2 for travellers in accordance with the invention, extending in a longitudinal direction L.

The body 2 comprises a body chassis 4, a roof 6, two lateral faces 8, 10 and two body end structural assemblies 12, 14. The body chassis 4, roof 6, two lateral faces 8, 10 and two body end structural assemblies 12, 14 define the carrier structure of the body 2 and are therefore each involved in the rigidity of the body 2.

The chassis 4, the roof 6 and the lateral faces 8, 10 may be, for example, composed of metal and may be in particular constructed from steel and/or aluminium.

Each of the faces 8, 10 extends between a longitudinal edge of the chassis 4 and a longitudinal edge of the roof 6. The chassis 4, the roof 6 and the lateral faces 8, 10 form a tubular cell extending in the direction L.

The chassis 4 is shorter than the roof 6 and the lateral faces 8, 10, and terminates at each of the longitudinal ends with spacing from the longitudinal ends of the roof 6 and the lateral faces 8, 10.

Each of the structural assemblies 12 and 14 is arranged at a longitudinal end of the body so as to close the body at that longitudinal end.

Each of the structural assemblies 12 and 14 is fixed to the chassis 4, the roof 6 and each of the lateral faces 8 and 10, and is involved in the rigidity of the body 2.

The body 2 is intended to be articulated to another body, the two bodies being supported with their adjacent body end structural assemblies on a bogie which is common to the two bodies.

The structural assembly 12 and the structural assembly 14 are different, each of the assemblies 12, 14 being complementary to the other in order to allow their mutual articulation when the structural assemblies 12, 14 are carried by two separate bodies, being supported on a common bogie, and with a communication passage between the bodies thereof.

Figure 2:
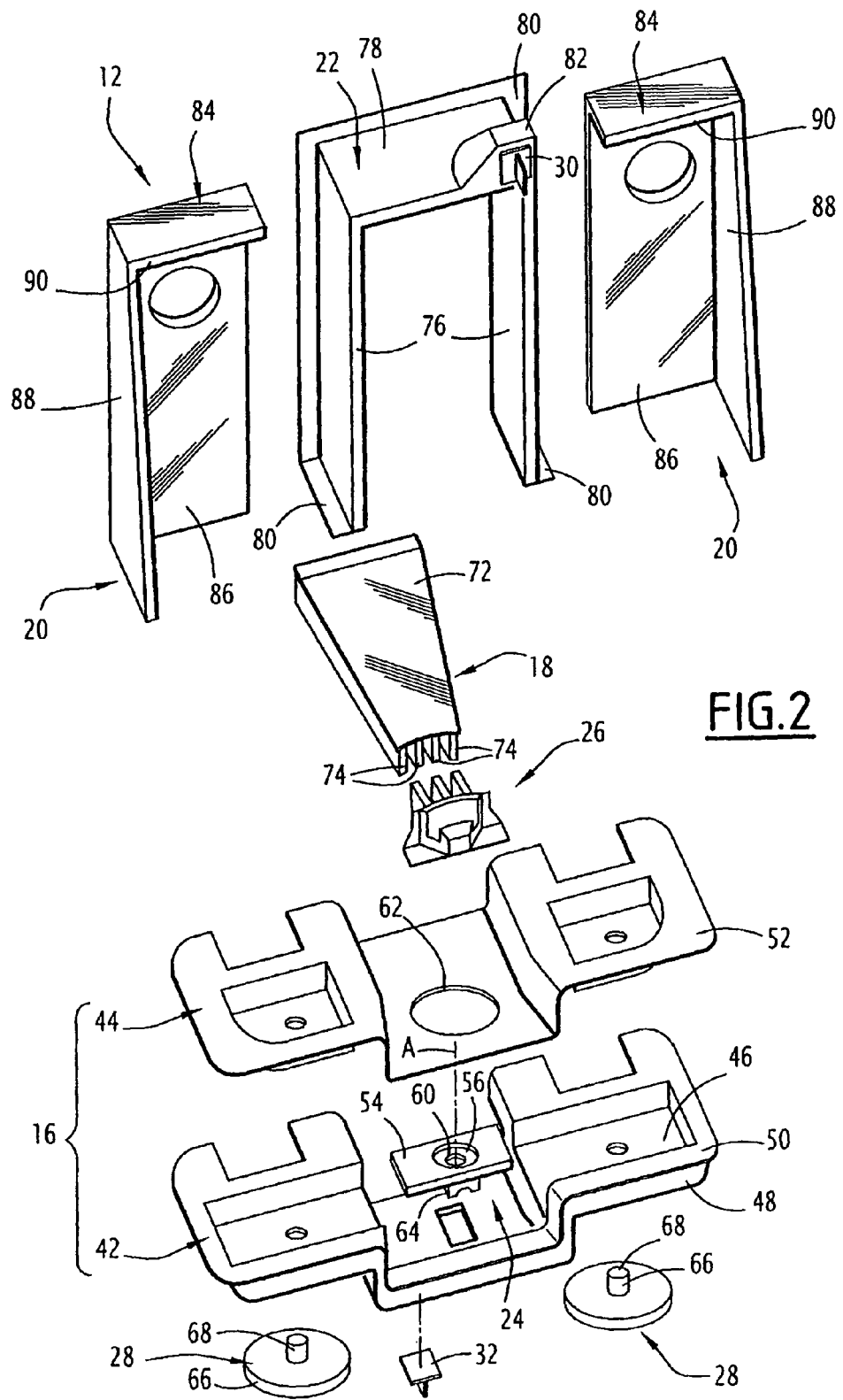
FIGS. 2 and 3 are schematic perspective views in the exploded and assembled state, respectively, of one of the body end structural assemblies according to the invention.
Figure 3:
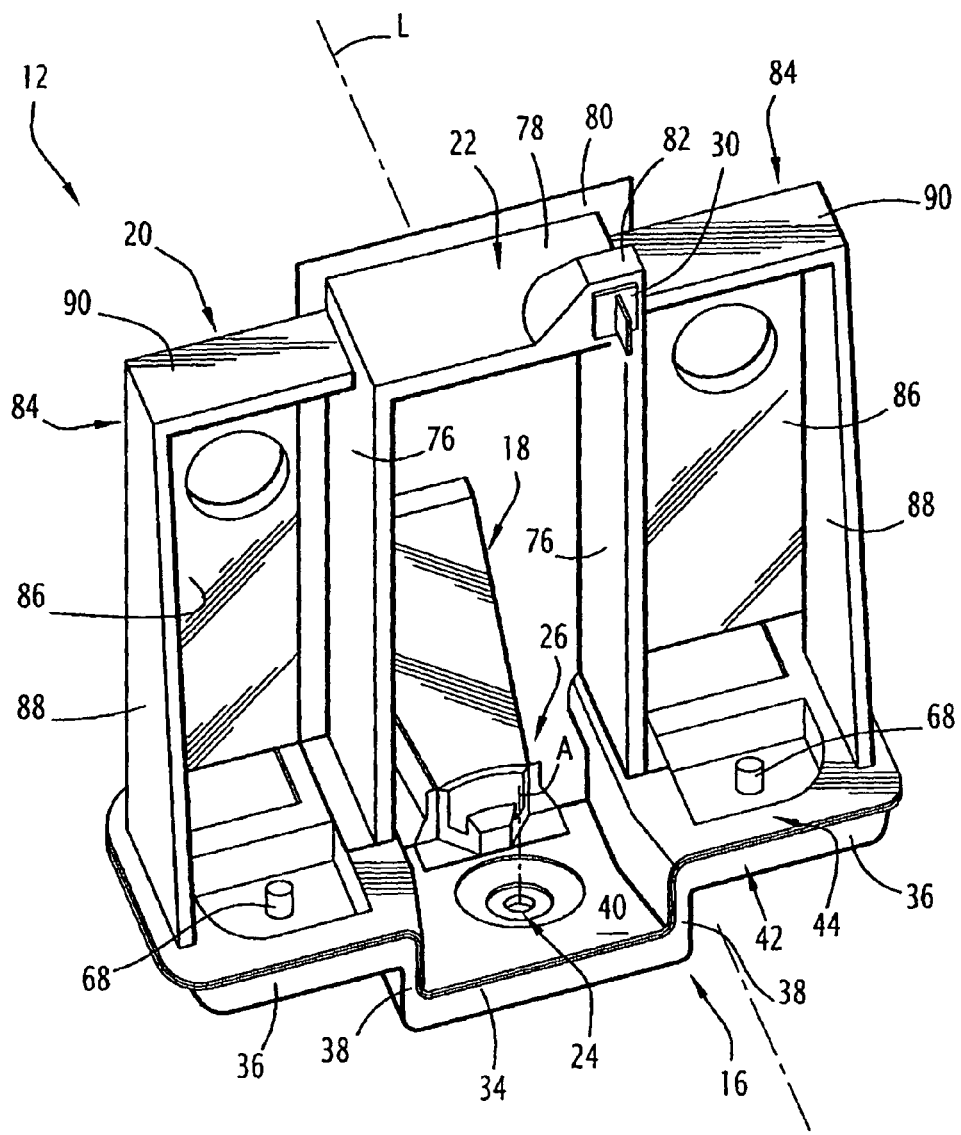

As illustrated in FIGS. 2 and 3, the structural assembly 12 is a carrier structural assembly.

The structural assembly 12 comprises a lower cross-member 16, a longitudinal beam 18, a closure wall 20 and a communication tunnel 22.

The lower cross-member 16, longitudinal beam 18, closure wall 20 and communication tunnel 22 may be constructed from composite materials, that is to say, from materials based on resin reinforced with fibres, for example, glass fibres, carbon fibres and/or Kevlar® fibres.

The structural assembly 12 comprises an articulation member 24 (FIG. 2), a coupling hook 26, suspension supports 28 (FIG. 2), an anti-roll damping support 30 and a transverse damping support 32 (FIG. 2).

The coupling hook 26, suspension supports 28, anti-roll damping support 30 and transverse damping support 32 may be constructed as metal inserts, constructed, for example, from steel and/or aluminium and are fixed to the elements composed of composite materials, the coupling hook 26, suspension supports 28, anti-roll damping support 30 and transverse damping support 32.

The cross-member 16 extends substantially horizontally and transversely relative to the direction L.

As illustrated in FIG. 3, the cross-member 16 comprises a central portion 34 and two lateral end portions 36 which are connected to the central portion 34 by stepped portions 38 so that the end portions 36 are displaced upwards relative to the central portion 34. Therefore, the cross-member 16 has a central recess 40 (FIG. 3).

As is more readily visible in FIG. 2, the cross-member 16 comprises a lower shell 42 and an upper shell 44 which are assembled together, conferring on the cross-member 16 a box-like structure. The shells 42 and 44 may be composed of composite material.

The shell 42 is generally in the form of a bowl which is open in an upward direction. The shell 42 has a base 46 and a peripheral wall 48 which extends upwards from the base 46, the wall 48 having an edge 50 which protrudes outwards.

The shell 44 is in contact, with its peripheral edge 52, with the edge 50 to which it is fixed, for example, by riveting or bolting.

The articulation member 24 is arranged inside the central portion 34 of the cross-member 16 between the shells 42, 44.

The articulation member 24 comprises a body 54 having, at an upper face, a cylindrical recess 56 which has a vertical axis A and which is open in an upward direction, and a hole 60 which is coaxial with the recess 56 and which extends through the body 54 from the base of the recess 56.

The shell 44 is provided with a circular opening 62 in alignment with the recess 56.

The articulation member 24 has supports 64 (only one being visible) which are arranged on a lower face of the body 54. The supports 64 are intended to be supported on a traction pivot of a bogie. Each support 64 is semi-cylindrical, has an axis parallel with the direction L and is open in a downward direction.

The supports 64 protrude from the shell 42 downwards through an opening thereof.

The suspension supports 28 are fixed under the end portions 36 of the cross-member 16. Each support 28 comprises a support disc 66 which is arranged under the corresponding end portion 36 and a cylindrical end-piece 68 which extends through a hole of the cross-member 16 and which protrudes vertically upwards at the upper face of the cross-member 16.

Each end portion 36 is intended to be supported, with the corresponding disc 66, on a suspension device which is suitable for bringing about the vertical suspension of the structural assembly 12 on a bogie which carries that structural assembly. A suspension device is, for example, in known manner a pneumatic diaphragm suspension. The end-piece 68 serves to connect the pressurised internal volume of the diaphragm to a pneumatic circuit.

The hook 26 is intended to bring about coupling of the structural element 12 to a complementary structural assembly.

The hook 26 is open in an upward direction, is fixed to the upper face of the central portion 34 of the cross-member 16, and is longitudinally displaced relative to the articulation member 24.

The beam 18 is fixed at one end to the central portion 34 of the cross-member 16 and extends longitudinally at the side of the body 2. In the example illustrated, the beam 18 is fixed to the hook 26. The beam 18 is intended to be connected, at the opposite end thereof, to the chassis 4 of the body 2 (FIG. 1).

The beam 18 is in one piece and is formed by a plate 72 which is provided with longitudinal ribs 74 at its lower face. The beam 18 is fixed to the hook 26 and the chassis 4 by its ribs 74.

The tunnel 22 comprises two vertical uprights 76 and an upper cross-member 18 which connects the upper ends of the uprights 76. The uprights 76 and the upper cross-member 78 are one-piece.

The tunnel 22 is provided with an edge 80 which projects towards the outer side of the tunnel 22 and which extends to the base of its uprights 76, and along its uprights 76 and its upper cross-member 78. The edge 80 serves to fix the tunnel 22 to the upper face of the cross-member 16 and the roof 6, for example, by riveting, bolting or adhesive-bonding.

The uprights 76 and the upper cross-member 78 delimit a passage having a height and width sufficient to allow passengers to pass through.

The upper cross-member 78 is provided with an extension 82 which projects upwards and to which the support 30 is fixed. The support 30 allows an anti-roll damper to be fixed, such as a hydropneumatic damper, which is intended to extend substantially along a transverse axis and to be fixed, at its opposite end, to a complementary body end structural assembly, in order to limit relative rotation of the body end structural elements about a longitudinal axis.

The wall 20 comprises two lateral panels 84 which are located laterally at one side and the other of the tunnel 22.

Each panel 84 has a panel 86 for closing the end of the body 2, having an internal edge which is fixed to the portion of the edge 80 that extends along an upright 76, and an external edge which is intended to be fixed to one of the lateral faces 8, 10 (FIG. 1).

Each panel 84 has a reinforcement upright 88 which extends the panel 86 towards the outer side of the body from the external edge thereof, and a cross-member 90 which extends the upper edge of the panel 88 towards the outer side of the body, and which is connected to the upper end of the upright 88. The panel 86, the upright 88 and the cross-member 90 may be one-piece.

The upright 88 is fixed at its base to the upper face of the cross-member 16 and the cross-member 90 is fixed at its end opposite the upright 88 to the tunnel 22, for example, by means of riveting, bolting or adhesive-bonding.

Figure 4:
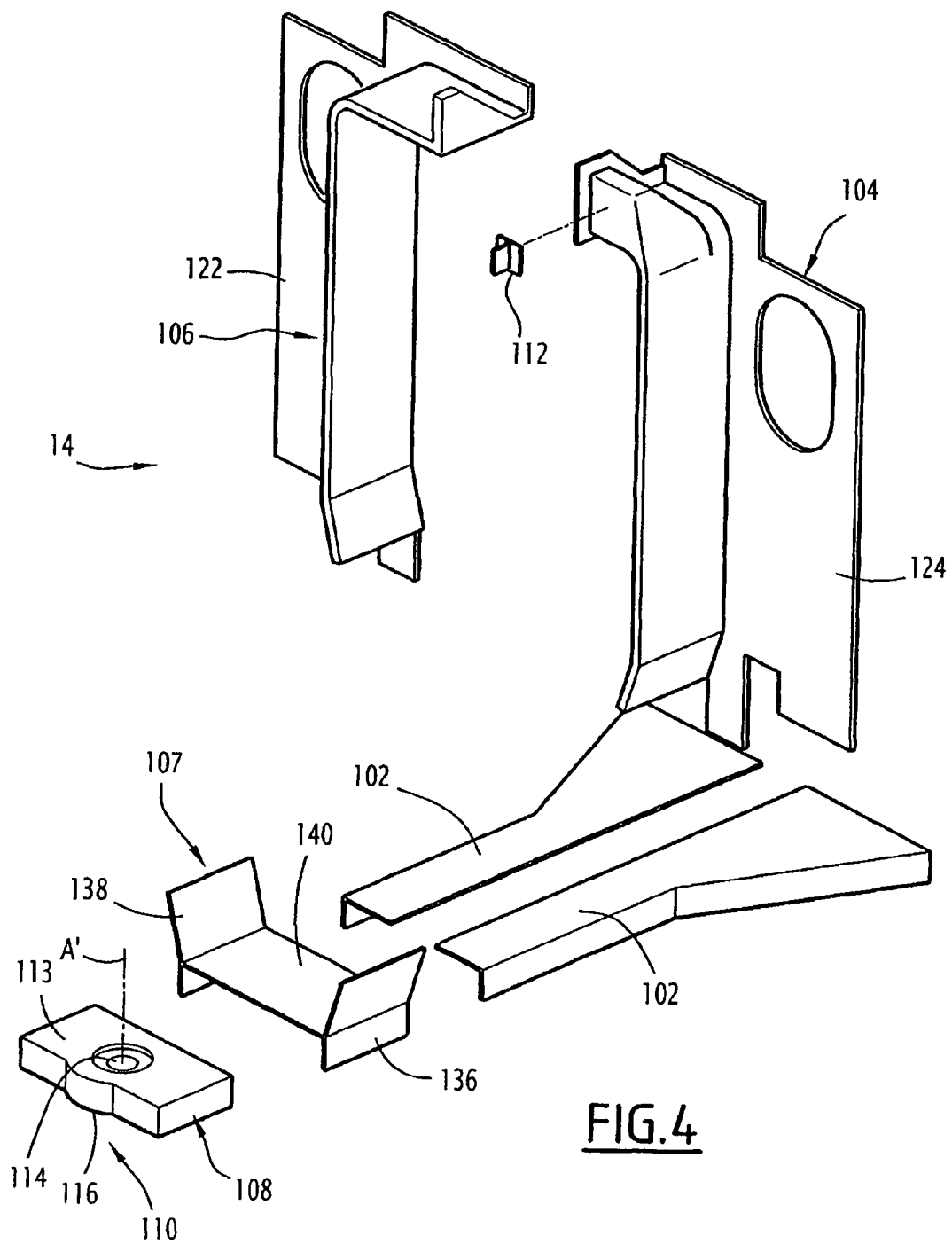
FIGS. 4 and 5 are schematic perspective views in the exploded and assembled state, respectively, of the other body end structural assembly according to the invention.
Figure 5:
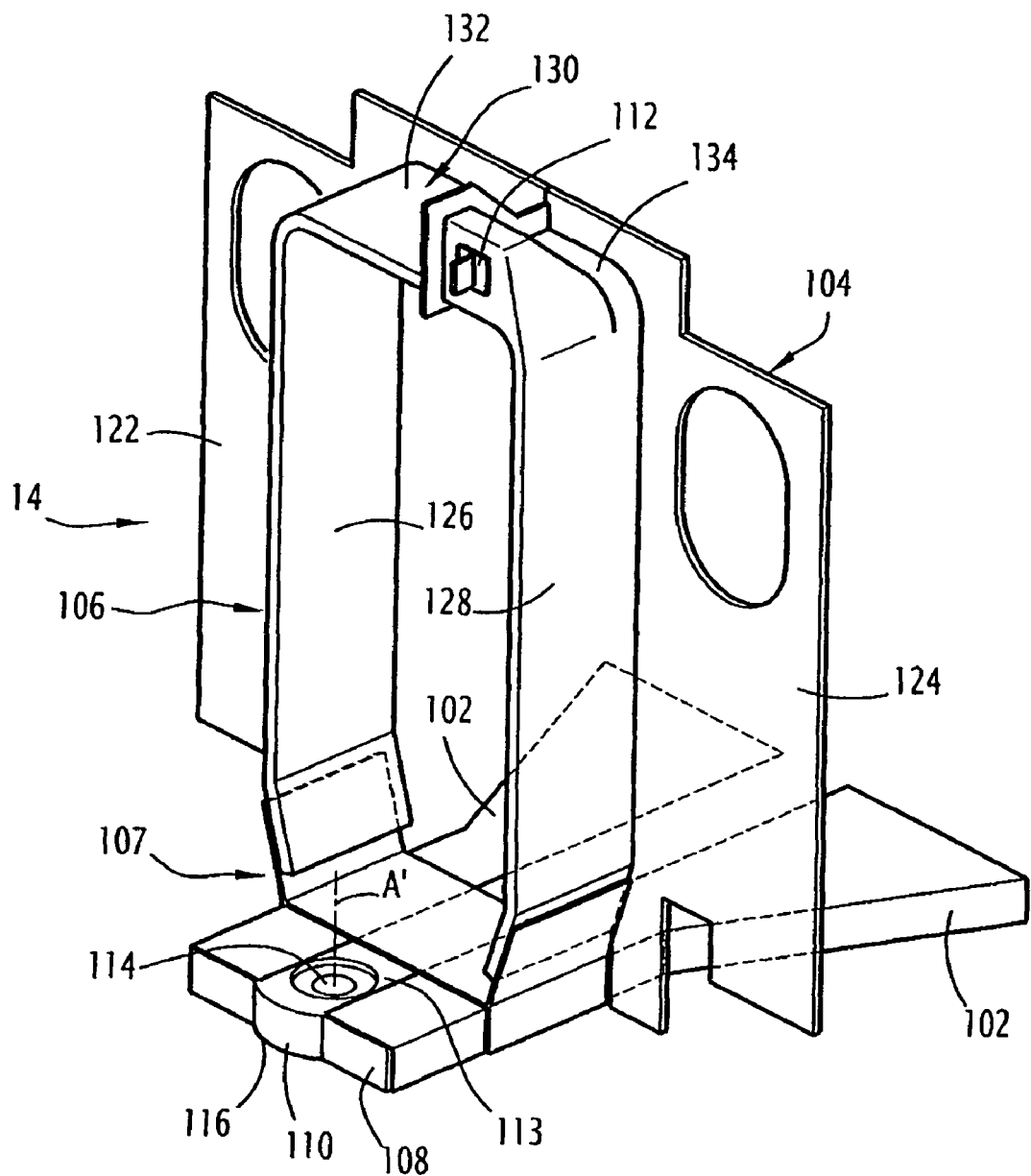

As illustrated in FIGS. 4 and 5, the body end structural assembly 14 comprises longitudinal beams 102, a closure wall 104, a communication tunnel 106 and a base 107.

The longitudinal beams 102, closure wall 104, communication tunnel 106 and base 107 may be constructed from composite materials, that is to say, materials based on resin reinforced with fibres, for example, glass fibres, carbon fibres and/or Kevlar® fibres.

The structural assembly 14 comprises an articulation member 108, a coupling member 110 and an anti-roll damping support 112.

The articulation member 108, coupling member 110 and anti-roll damping support 112 may be constructed in the form of metal inserts, constructed, for example, from steel and/or aluminium.

The articulation member 108 comprises a body 113 having a hole 114 which extends along an articulation axis A', and which is intended to receive an articulation pivot.

The coupling member 110 may be one-piece with the articulation member 108 and is in the form of a coupling rib 116 which extends downwards from the body 113 and which is intended to be engaged with a finger of a coupling hook. The rib 116 extends in a circular arc about the articulation axis A'.

There are two beams 102 in the example illustrated and the beams 102 extend longitudinally. Each beam 102 has an end fixed to the articulation member 108 and an opposite end intended to be fixed to the chassis 4 of the body 2. In a variant, the beams 102 may be constructed in one piece.

The wall 104 is formed by two panels 122, 124 which extend perpendicularly relative to the longitudinal direction. The panel 122 is wider than the panel 124.

The tunnel 106 comprises two uprights 126, 128 and an upper cross-member 130 which connects the uprights 126, 128 at the upper ends thereof. The cross-member 130 comprises two portions 132, 134.

The upright 126 and the portion 132 may be one-piece with the panel 122. The upright 128 and the portion 134 may be one-piece with the panel 124.

The portion 134 has an extension which projects upwardly and which has a face, to which the support 112 is fixed.

The external and upper edges of the panels 122, 124 are intended to be fixed to the lateral faces 8, 10 and the roof 6 of the body 2.

The bases of the uprights 126 and 128 are fixed to the beams 102 by the base 107. The base 107 may be of H-like form and comprises a first leg 136 and a second leg 138 which are connected by a transverse link 140. Each leg 136, 138 has an upper portion fixed to the base of the corresponding upright 126, 128 and a lower portion fixed to the corresponding beam 102.

Figure 6:
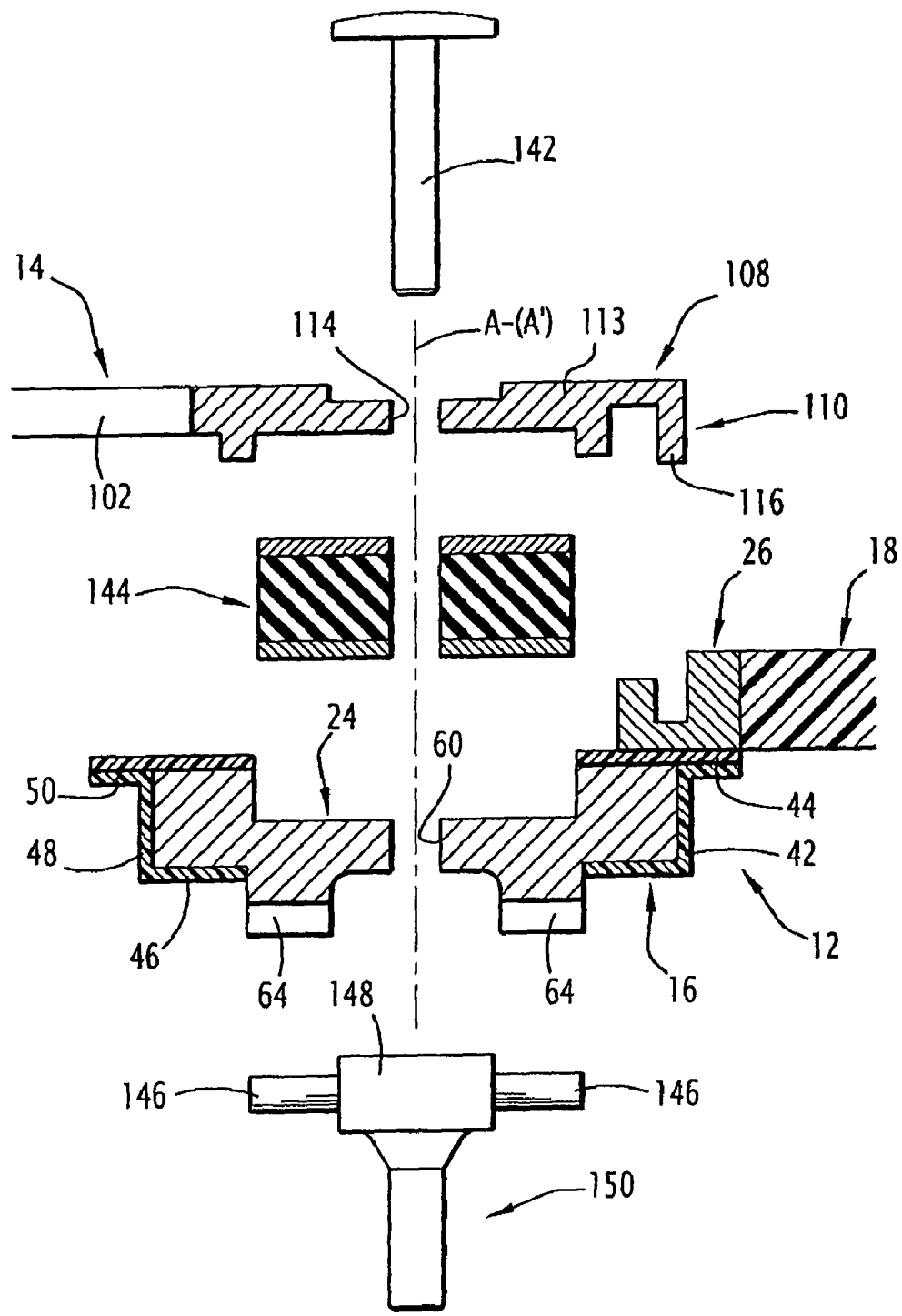
FIG. 6 is an exploded longitudinal sectional view of two body end structural assemblies according to the invention, articulated to each other.

FIG. 6 is a side view, as an exploded longitudinal section, of a carrier structural assembly 12 and a carried structural assembly 14, which are articulated to each other and supported on a bogie.

The structural assemblies 12 and 14 are arranged in such a manner that the articulation member 108 is located above the articulation member 24, the axes A and A' being aligned.

An articulation pivot 142 is inserted in a downward direction in the holes in such a manner that the structural assemblies 12 and 14 are mutually articulated about the axis of the pivot that is aligned with the axes A and A'.

After assembly, the structural assemblies 12 and 14 are mutually coupled by the coupling rib 116 which is inserted in the hook 26 and which engages therewith. Since the rib 116 extends in a circular arc which is centred about the axis A, the rib 116 and the hook 26 allow relative rotation of the structural assemblies 12 and 14 about the axis A (A').

A suspension ring 144 is interposed between the articulation member 108 and the articulation member 24.

The ring 144 comprises metal inserts and layers of elastomer material, which are superimposed and alternate.

In the assembled state, the ring 144 is received in the recess 56 through the opening 62, and the articulation member 108 is in vertical abutment, by means of the ring 144, against the articulation member 24 forming an articulation support. In this manner, the structural assembly 14 is supported by the structural assembly 12.

The articulation member 24 is supported, with its supports 64, on journals 146 which protrude from an upper head 148 of a vertical traction pivot 150 which is mounted on a bogie chassis. The journals 146 are diametrically opposed and extend perpendicularly relative to the axis of the pivot 150.

The pivot 150 is intended to be rigidly fixed to the chassis of a bogie.

The supports 64 may rotate about journals 146 in order to allow rolling attenuation of the structural assembly 12 relative to the bogie.

During operation, each of the structural assemblies 12 and 14 is involved in the rigidity of the body 2. In particular, the walls of those structural assemblies 12 and 14 contribute to maintaining the cross-section of the body.

Each of the structural assemblies 12 and 14 brings about the transfer of the load from the body 2 to a bogie, the longitudinal connection to that bogie and the longitudinal connection and articulation with respect to an adjacent body.

Each of the structural assemblies 12 and 14 has a communication tunnel allowing passengers to pass from the car to an adjacent car. When two structural elements are articulated to each other, a communication bellows or any other means for bringing about the sealing of the communication means and protecting the passengers from noise connects the tunnels.

In each of the structural assemblies 12 and 14, each longitudinal beam brings about transmission of the longitudinal loads between the articulation members and the chassis of the body.

The construction of the structural elements, from composite materials, at least in part, allows sufficient rigidity to be conferred on them, while limiting their weight.

The reduction of the weight of the body may allow an increase in the number of passengers who can embark onboard the body, while complying with the limits concerning permitted loads on the axles of the bogies supporting the body.

The body end structural elements have reduced dimensions, in particular with regard to those of the chassis, the lateral faces or the roof. Therefore, it may be easier and cheaper to construct those body end structural assemblies from composite materials than to construct the other elements of the body from composite materials.

Furthermore, the body end structural elements are generally a large proportion of the total weight of the body.

Consequently, the reduction in the weight of those body end structural assemblies, by using composite materials, may allow the total weight of the body to be effectively reduced, while limiting the additional costs brought about by using composite materials.

Given that the end structural elements of bodies of cars of an articulated set support the weight of the body and bring about simultaneously the longitudinal connection of the body to another body and the bogie, those body end structural elements withstand very high stresses.

It may be possible to obtain body end structural assemblies which are at least partially composed of composite materials which are sufficiently strong.

In particular, the lower cross-member of box-like form obtained by assembling two shells may be particularly rigid. Furthermore, the addition of metal inserts inside the cross-member may allow reinforcement thereof. The metal inserts may be advantageously provided in the form of a member for articulating the body end structural assembly to another body end structural assembly of another car.

Thus, the invention generally provides a lower cross-member of an end structural assembly of a rail car body comprising two shells of composite materials which are assembled together and which form a box-like structure, and a member for articulating the body end structural assembly to a corresponding assembly, the articulation element being of metal and being inserted inside the cross-member, between the shells, so as to reinforce the cross-member.

FIGS. 2 and 3 illustrate panels and tunnels which are separate. In a variant, the panels and the tunnel may be constructed in one piece and from composite materials.

In addition, the cross-member, instead of being formed by two shells, may be formed in one piece in a variant. In that case, the metal inserts such as the articulation member and the support discs may be fixed above or below the cross-member.

Figure 7:
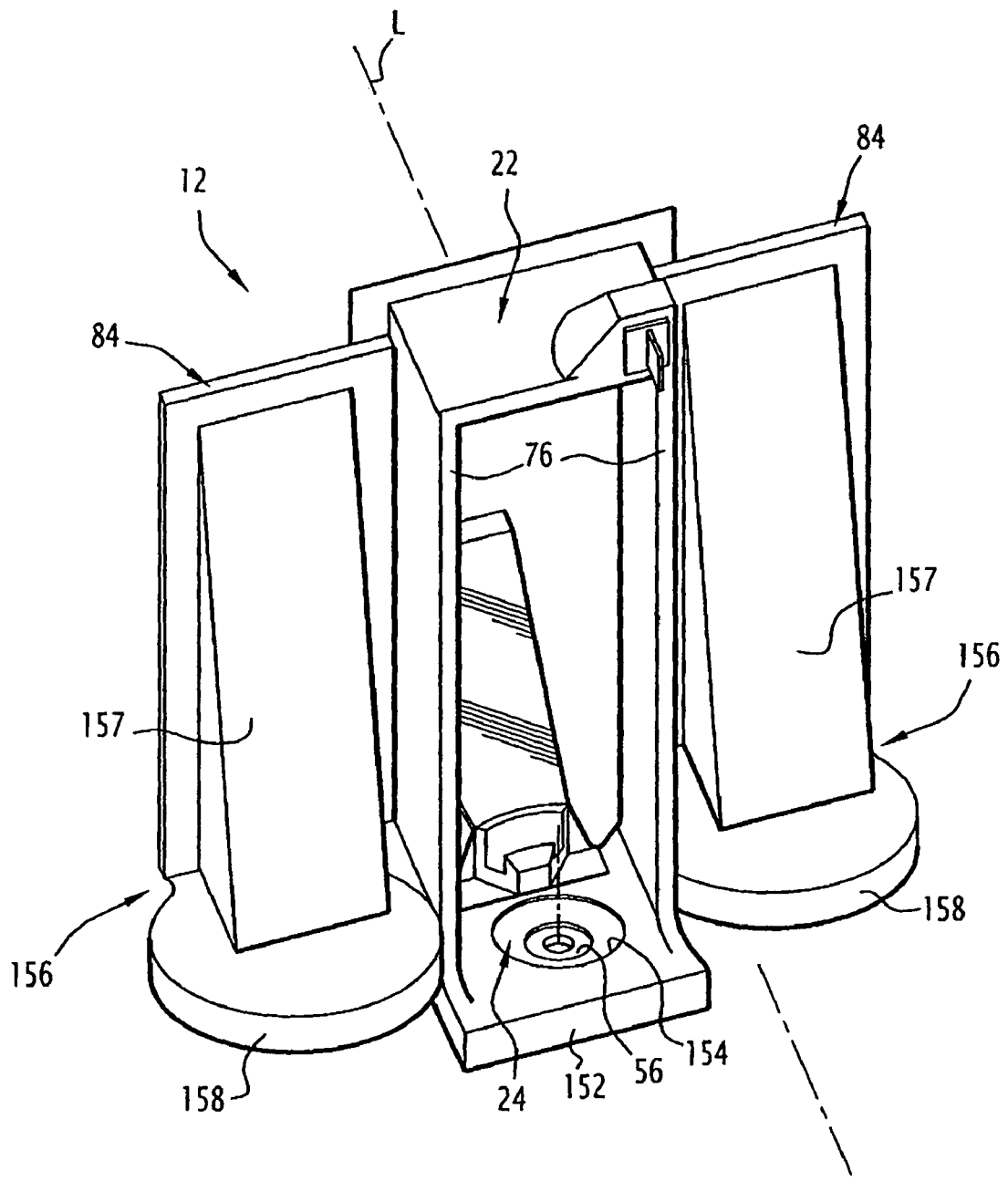
FIGS. 7 to 9 are views similar to that of FIG. 3, illustrating end structural assemblies according to variants.
Figure 8:
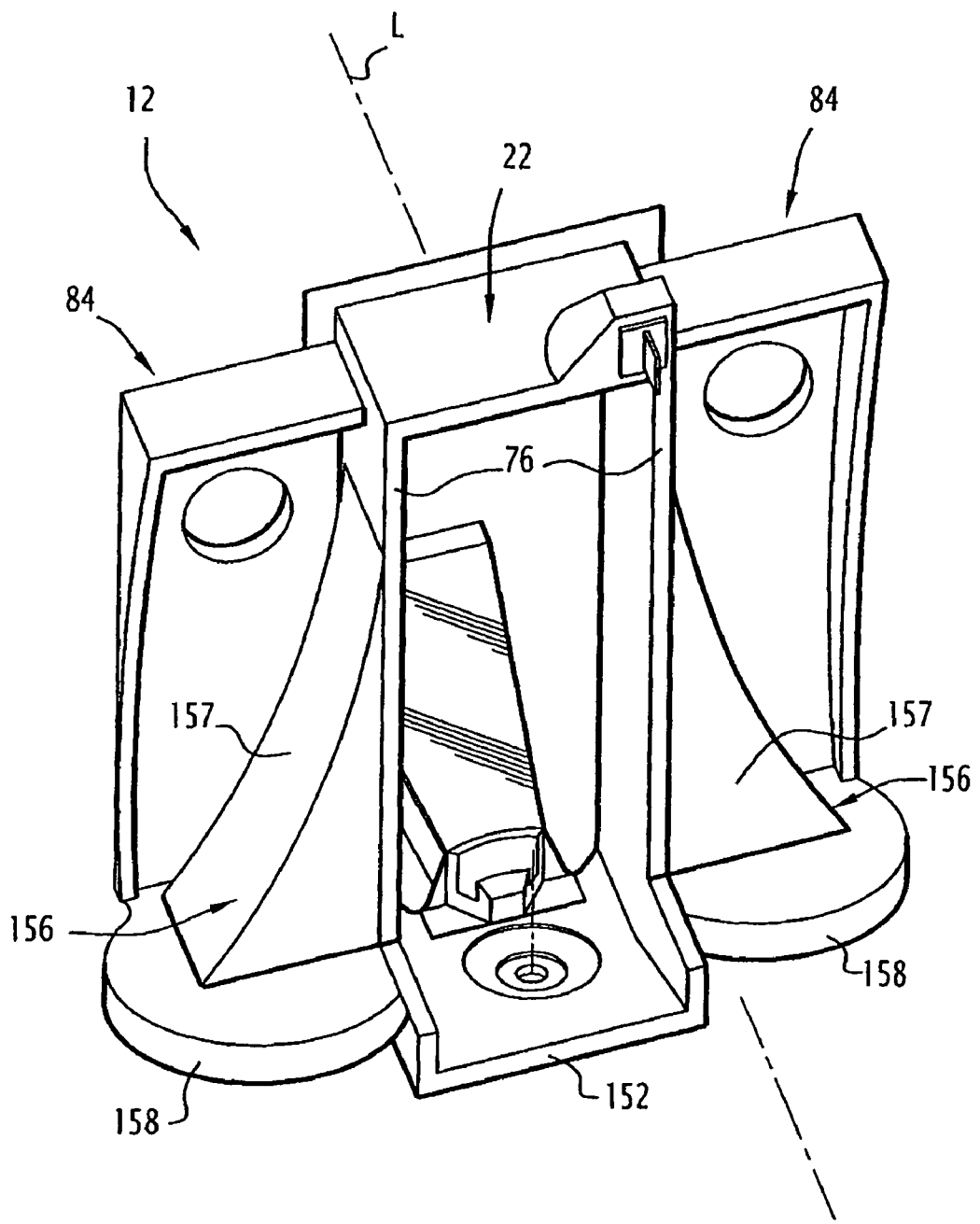
Figure 9:
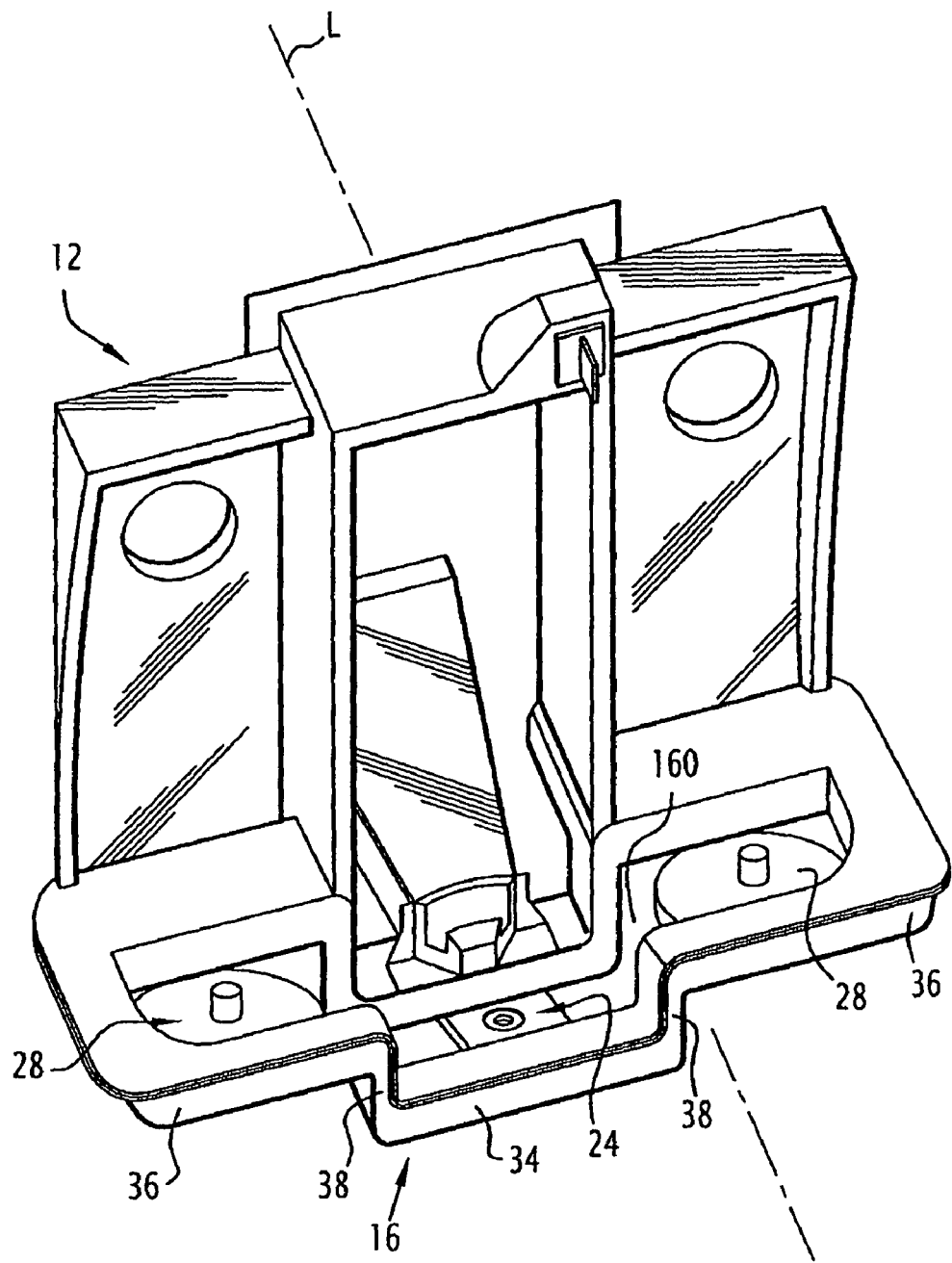

Variants of carrier body end structural assemblies are illustrated in FIGS. 7 to 9, in which the references to elements which are similar to those from FIGS. 1 to 6 have been retained.

As illustrated, a structural assembly 12 differs from that in FIGS. 2 and 3 mainly in that it does not comprise a cross-member whose end portions are intended to be supported on pneumatic suspension diaphragms.

Instead, the structural assembly 12 comprises a tunnel 22 of annular form comprising a cradle 152 which connects the lower ends of the uprights 76 of the tunnel 22.

The cradle 152 comprises a circular opening 154 and the articulation member 24 is fixed below the cradle 152 in such a manner that the recess 56 is located under the opening 154.

In order to be supported on pneumatic suspension diaphragms, the structural assembly 12 comprises two brackets 156, each fixed to one of the panels 84.

The brackets 156 are constructed from composite materials.

Each bracket 156 is in the form of a vertical pillar 157 which is fixed against the corresponding panel 84 and which widens downwards in the longitudinal direction of the body, and which comprises, at its base, a foot 158 for support on a suspension device.

Each foot 158 is in the form of a disc and is intended to receive, under its lower surface, a support disc on a pneumatic suspension diaphragm.

In this manner, the support loads of the assembly 12 on the suspension devices are transmitted towards the panels 84 by the brackets 156.

Each bracket 156 is secured to the corresponding panel 84 or constructed in one piece therewith, and each panel 84 is secured to the tunnel 22 or constructed in one piece therewith.

The variant of FIG. 8 differs from that of FIG. 7 in that the brackets 156 extend along the uprights 76 of the tunnel 22 and widen in the transverse direction of the body.

The embodiment of FIG. 9 differs from that of FIGS. 2 and 3 owing to the shape of its cross-member 16.

As illustrated in FIG. 9, the cross-member 16 has an annular structure and has an aperture 160 which extends along the cross-member 16 in the end portions 36 and the central portion 34.

The discs 28 and the member 24 are fixed below the cross-member 16. The aperture 160 may reduce the weight of the cross-member 16 without weakening the cross-member 16 substantially and affords access to the member 24 and the discs 28 from above.

It will be appreciated that the embodiments incorporating a cross-member (FIGS. 2, 3 and 9) allow the communication tunnel to be widened in comparison with the embodiments having brackets. Furthermore, the mass/cost gain may be greater in those embodiments owing to the lesser weight of the cross-member relative to the brackets, while retaining adequate mechanical characteristics. Furthermore, the longitudinal dimensions of the carrying structural element may be smaller with the cross-member than with the brackets, which reduces the spacing between the adjacent cars and which allows the length of the set to be reduced or each car to be extended while retaining the same length for a set.

Dispensing with the brackets may further free space between the bodies in order to receive equipment or to allow the passage of cables and conduits (for example, power supply, communication . . . ) between the bodies.

The lower cross-member advantageously comprises the means for mechanical connection to the bogie, such as the articulation member. In this manner, the necessary provisions may be carried out to the carrier body end structural assembly before it is fixed to the body, which facilitates the construction of those provisions.

Thus, the invention generally provides an end structural assembly of a rail car body, the body comprising a chassis, a roof and lateral faces, the end structural assembly being of the type intended to be arranged at a longitudinal end of the body in order to articulate the body to a body of another adjacent car and to transfer the load of the body on a common support bogie to that other car, the body end structural element comprising a lower cross-member having a central portion and two lateral portions, the central portion being provided in order to carry a member for articulating the body to another body, and each lateral portion being suitable for being supported on suspension devices of the body on a bogie, such as, for example, pneumatic suspension diaphragms.

The invention also provides an articulated set having a car comprising a structural assembly of this type, being supported by means of the lateral portions of its lower cross-member on suspension devices.

The advantages associated with the use of a cross-member provided in order to be carried on the suspensions in place of brackets may be obtained just as well with a metal cross-member as with a cross-member constructed from composite materials, in one piece or by means of shell-like assembly in order to form a cross-member having a box-like structure, though the cross-member composed of composite materials will be lighter.

The lower cross-member may be constructed from steel, aluminium, aluminium alloy or composite material.

Figure 10:
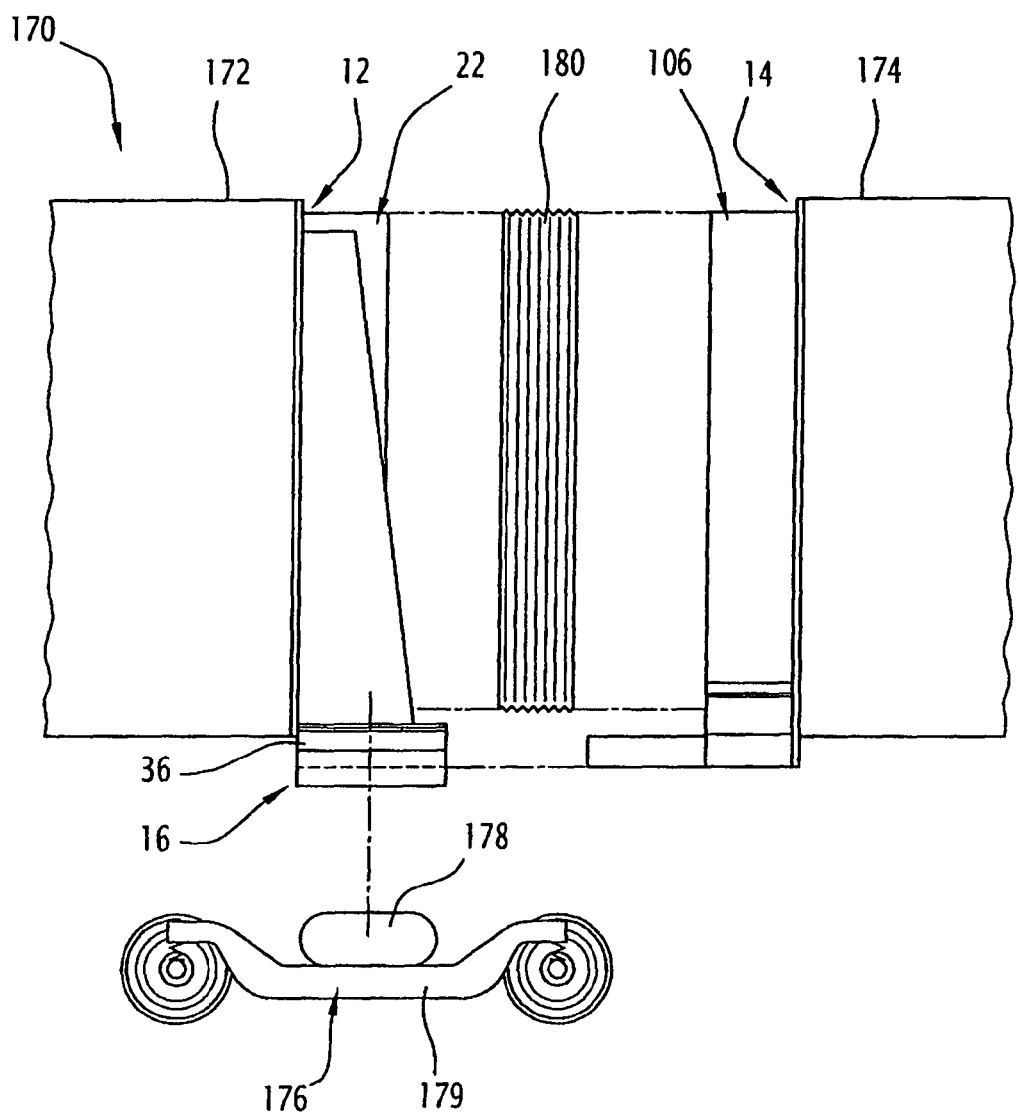
FIGS. 10 and 11 are side views, before and after assembly, respectively, of two cars of a set connected by two complementary body end structural assemblies.
Figure 11:
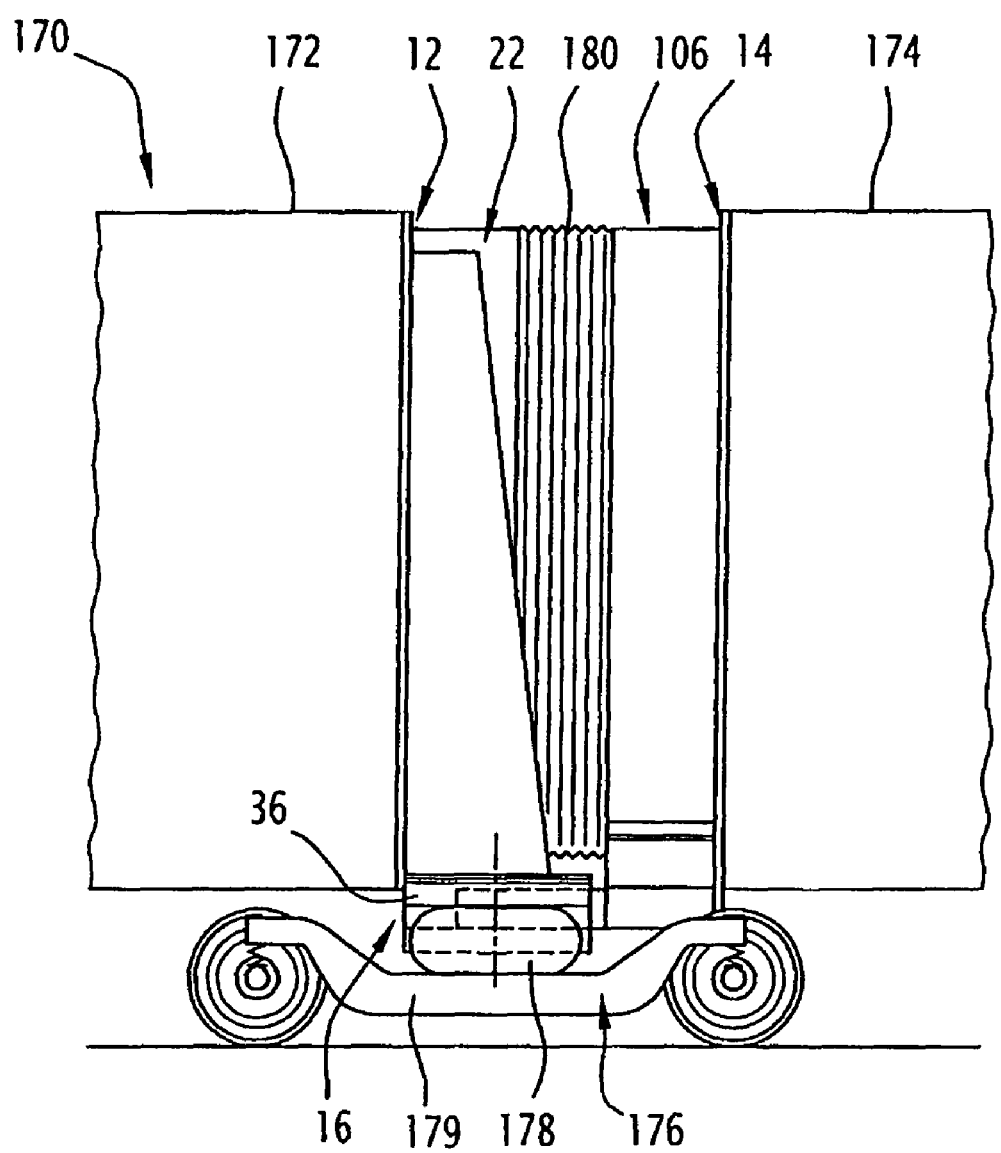

As illustrated in FIGS. 10 and 11, a set 170 which is composed of a row of cars, comprises a first car 172 and a second car 174 which are adjacent, and a bogie 176 which is common to the two cars 172, 174.

The cars 172 and 174 are illustrated before assembly in FIG. 10.

The first car 172 has a carrier body end assembly 12 whose lower cross-member 16 is provided to be supported, by means of its lateral portions 36, on suspension devices 178 which are interposed between the structural assembly 12 and a chassis 179 of the bogie 176.

The second car 174 has a carried body end structural assembly 14 which is complementary to the carrier body end structural assembly 12 and which is provided in order to be articulated to and supported on the carrier body end assembly 12.

The cars 172 and 174 are illustrated after assembly in FIG. 11, in which the body end assemblies 12 and 14 of the cars 172 and 174 are articulated to each other, respectively. The carried body end assembly 14 is supported on the carrier body end assembly 12 and is articulated with respect to it about a substantially vertical axis. The structural assemblies 12 and 14 are connected in the manner illustrated in FIG. 6.

A sealing bellows 180 is arranged between the free ends of the communication tunnels 22, 106 of the assemblies 12 and 14.

The invention claimed is:

1. An end structural assembly of a rail car body for fixing to a longitudinal end of the rail car body, the rail car body including a chassis, a roof, and a plurality of lateral faces, the chassis, roof, and plurality of lateral faces forming a tubular cell, and for articulating the body to a further adjacent rail car body and for transferring a load of the rail car body to a body support bogie common to the further adjacent rail car body, the end structural assembly comprising:

a lower cross-member including a central portion and two lateral portions, the lower cross-member constructed at least partially from composite material, the lower cross-member including a lower shell and an upper shell, the lower shell and upper shell being superimposed and conferring on the lower cross-member a box structure, the central portion for carrying an articulation member for articulating the rail car body to the further adjacent rail car body, the articulation member for articulation to another end structural assembly fixed to the adjacent rail car body, the articulation member being a metal insert inserted inside the lower cross-member, the metal insert having a hole for receiving a pivot member, each lateral portion being supported on suspension devices for the rail car body on the body support bogie, the end assembly closing the rail car body at the longitudinal end.

2. The assembly as recited in claim 1 wherein the lower cross-member is constructed in one piece.

3. The assembly as recited in claim 1 wherein the lower cross-member includes a recess above the articulation member, the recess for receiving a suspension ring for being arranged vertically between the articulation member and a corresponding articulation member of the another end structural assembly.

4. The assembly as recited in claim 1 further comprising at least one longitudinal thrust beam fixed to a connection member or the lower cross-member, the longitudinal thrust beam capable of extending between the articulation member and the chassis towards an inner side of the rail car body.

5. The assembly as recited in claim 4 wherein the at least one longitudinal thrust beam includes two separate longitudinal thrust beams.

6. The assembly as recited in claim 1 further comprising at least one coupling member for coupling to the another end structural assembly of the adjacent rail car body.

7. The assembly as recited in claim 1 further comprising a communication tunnel allowing passengers to pass through the end structural assembly into the adjacent rail car body.

8. The assembly as recited in claim 7 wherein the tunnel is constructed from a composite material.

9. The assembly as recited in claim 8 further comprising closure panels, the closure panels being located laterally at one side and an other side of the tunnel, the closure panels extending transversely to at least partially close the longitudinal end of the rail car body.

10. A rail car body comprising:
at least one body end structural assembly as recited in claim 1;
the chassis;
the roof; and
the plurality of lateral faces, each lateral face extending between a longitudinal edge of the roof and a longitudinal edge of the chassis;
the at least one end structural assembly being fixed to a longitudinal end of the chassis.

11. A set comprising:
a first car; and
a second car adjacent to the first car;
the first and second cars each including:
the chassis;
the roof;
the plurality of lateral faces; and
a bogie common to the first and second cars;
the first car having a carrier body end structural assembly, the carrier body end structural assembly being the end structural assembly as recited in claim 1 fixed to the longitudinal end of the rail car body of the first car and supported on suspension devices interposed between the carrier body end structural assembly and the bogie,
the second car having a carried body end structural assembly fixed to a longitudinal end of the body of the second car, the carried body end structural assembly being complementary to the carrier body end structural assembly, supported on the carrier body end structural assembly and articulated thereto.

12. The set as recited in claim 11 wherein the carrier body end structural assembly and carried body end structural assembly have communication tunnels allowing passage from the first car to the second car and from the second car to the first car.

13. The assembly as recited in claim 9 wherein the closure panels are constructed from a composite material.

14. The assembly as recited in claim 1 further comprising a coupling hook connected to the lower cross member.

15. The assembly as recited in claim 1 further comprising at least one suspension support connected to the lower cross member.

16. The assembly as recited in claim 8 further comprising an anti-roll damping support connected to the communication tunnel.

17. The assembly as recited in claim 1 wherein the end structural assembly is fixed to the chassis, roof and each of the plurality of lateral faces.

18. The assembly as recited in claim 1 further comprising a transverse damping support connected to the lower cross member.

19. An end structural assembly of a rail car body for fixing to a longitudinal end of the rail car body, the rail car body including a chassis, a roof, and a plurality of lateral faces, the chassis, roof, and plurality of lateral faces forming a tubular cell, and for articulating the body to a further adjacent rail car body and for transferring a load of the rail car body to a body support bogie common to the further adjacent rail car body, the end structural assembly comprising:

a lower cross-member including a central portion and two lateral portions, the lower cross-member constructed at least partially from composite material; and a transverse damping support connected to the lower cross member, the central portion for carrying an articulation member for articulating the rail car body to the further adjacent rail car body, the articulation member for articulation to another end structural assembly fixed to the adjacent rail car body, the articulation member being a metal insert inserted inside the lower cross-member, the metal insert having a hole for receiving a pivot member, each lateral portion being supported on suspension devices for the rail car body on the body support bogie, the end assembly closing the rail car body at the longitudinal end.

\* \* \* \* \*